United States Patent
Cubr et al.

(10) Patent No.: US 7,526,943 B2
(45) Date of Patent: May 5, 2009

(54) KNOCK SYSTEM WITH DETECTION ZONES

(75) Inventors: Anthony E. Cubr, Fenton, MI (US); Craig M. Sawdon, Williamston, MI (US); Wajdi B. Hamama, Whitmore Lake, MI (US); Karl T. Kiebel, Royal Oak, MI (US); Robert J. Horner, Dexter, MI (US); Marilyn L Kindermann, Milford, MI (US); Jian Lin, Beverly Hills, MI (US); Trenton W. Haines, Novi, MI (US); Eric Ferch, Northville, MI (US); Hamid M. Esfahan, Ann Arbor, MI (US); James T. Kurnik, Linden, MI (US); Weixin Yan, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/853,124

(22) Filed: Sep. 11, 2007

(65) Prior Publication Data

US 2008/0229806 A1 Sep. 25, 2008

Related U.S. Application Data

(60) Provisional application No. 60/919,951, filed on Mar. 23, 2007.

(51) Int. Cl.
*G01L 23/22* (2006.01)

(52) U.S. Cl. .................................................. 73/35.09
(58) Field of Classification Search ...... 73/35.01–35.13
See application file for complete search history.

(56) References Cited

U.S. PATENT DOCUMENTS

| | | | | |
|---|---|---|---|---|
| 5,408,863 | A * | 4/1995 | Sawyers et al. | 73/35.05 |
| 5,608,633 | A * | 3/1997 | Okada et al. | 701/111 |
| 5,811,667 | A * | 9/1998 | Yamada et al. | 73/114.07 |
| 5,934,256 | A * | 8/1999 | Wenzlawski et al. | 123/479 |
| 6,411,886 | B1 * | 6/2002 | Morra et al. | 701/111 |
| 6,748,922 | B2 * | 6/2004 | Uchida et al. | 123/406.38 |
| 6,868,330 | B2 * | 3/2005 | Saikkonen | 701/111 |
| 6,945,229 | B1 * | 9/2005 | Zhu et al. | 123/406.21 |
| 7,055,372 | B2 * | 6/2006 | Daniels et al. | 73/35.08 |
| 2004/0158388 | A1 * | 8/2004 | Fujiwara et al. | 701/111 |
| 2006/0116812 | A1 * | 6/2006 | Akazaki et al. | 701/114 |

* cited by examiner

*Primary Examiner*—Hezron Williams
*Assistant Examiner*—Gunnar J Gissel

(57) ABSTRACT

A knock detection module for an engine comprises a statistics storage module and a processing module. The statistics storage module stores M times N vibration profiles corresponding to M zones of operation of the engine and N cylinders of the engine, wherein M and N are integers greater than one. The processing module determines in which one of the M zones the engine is operating and determines whether knock has occurred for one of the N cylinders by comparing measured vibration data with a selected one of the vibration profiles corresponding to the one of the M zones and the one of the N cylinders.

26 Claims, 5 Drawing Sheets

KNOCK SYSTEM WITH DETECTION ZONES

CROSS-REFERENCE TO RELATED APPLICATIONS

This application claims the benefit of U.S. Provisional Application No. 60/919,951, filed on Mar. 23, 2007. The disclosure of the above application is incorporated herein by reference.

FIELD

The present disclosure relates to detecting engine knock and more specifically to detecting engine knock using digital signal processing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a knock control system 100 according to the prior art is presented. The knock control system 100 includes an engine 102, which includes multiple cylinders 104. The engine 102 includes a vibration sensor 106 that measures vibration of the engine 102. Vibration may be caused by early detonation within the cylinders 104, also referred to as knock. In various implementations, the vibration sensor 106 may include a piezoelectric accelerometer.

An output of the vibration sensor 106 is received by an analog to digital (A/D) converter 110. The A/D converter 110 digitizes the output of the vibration sensor 106 and communicates the digitized output to a Digital Signal Processor (DSP) 114. The DSP 114 performs a Fast Fourier Transform (FFT) on the digitized output. The frequency content of the digitized output is transmitted to a knock detection module 116.

The knock detection module 116 determines whether knock is occurring based upon the frequency content of the output of the vibration sensor 106. The knock detection module 116 may select a peak intensity or an average intensity across the frequencies of the FFT calculated by the DSP 114. The knock detection module 116 may compare the average or peak intensity to a threshold intensity, determining that knock is present if the threshold intensity is exceeded.

The knock detection module 116 may adapt the threshold intensity to background vibration unrelated to knock that is present in the engine 102. The knock detection module 116 transmits knock information to a knock control module 118. Based on the knock information, the knock control module 118 varies parameters of the engine 102 to reduce knock. For example, the knock control module 118 may instruct the engine 102 to retard spark.

SUMMARY

A knock detection module for an engine comprises a statistics storage module and a processing module. The statistics storage module stores M times N vibration profiles corresponding to M zones of operation of the engine and N cylinders of the engine, wherein M and N are integers greater than one. The processing module determines in which one of the M zones the engine is operating and determines whether knock has occurred for one of the N cylinders by comparing measured vibration data with a selected one of the vibration profiles corresponding to the one of the M zones and the one of the N cylinders.

In other features, each of the vibration profiles includes an average value and a standard deviation value. The processing module determines that knock has occurred if the measured vibration data is greater than the average value of the selected one of the vibration profiles plus a predetermined number times the standard deviation value of the selected one of the vibration profiles. The processing module updates the selected one of the vibration profiles with the measured vibration data after the processing module has determined that knock has not occurred.

In further features, each of the vibration profiles includes a count value, and the processing module updates the count value of the selected one of the vibration profiles when the selected one of the vibration profiles is updated. Each of the vibration profiles includes a sum of squares and a sum, and the processing module updates the sum of squares and the sum of the selected one of the vibration profiles when the selected one of the vibration profiles is updated.

In still other features, the processing module recalculates the average value and the standard deviation value of the selected one of the vibration profiles when the count value of the selected one of the vibration profiles reaches a predetermined number. The processing module calculates a true standard deviation for the vibration profiles. The statistics storage module comprises nonvolatile memory. The measured vibration data is based upon measurements made during a specified time window corresponding to the one of the N cylinders.

In other features, the knock detection module further comprises a digital signal processor (DSP) that performs a Fast Fourier. Transform (FFT) including F points during the specified time window. The DSP performs a plurality of FFTs during the specified time window, and the processing module combines the plurality of FFTs into an aggregate FFT. The measured vibration data comprises an intensity value and the processing module reduces the F points to the intensity value.

A method for detecting knock in an engine comprises storing M times N vibration profiles corresponding to M zones of operation of the engine and N cylinders of the engine, wherein M and N are integers greater than one; determining in which one of the M zones the engine is operating; measuring vibration data for one of the N cylinders; and determining whether knock has occurred for the one of the N cylinders by comparing measured vibration data with a selected one of the vibration profiles corresponding to the one of the M zones and the one of the N cylinders.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
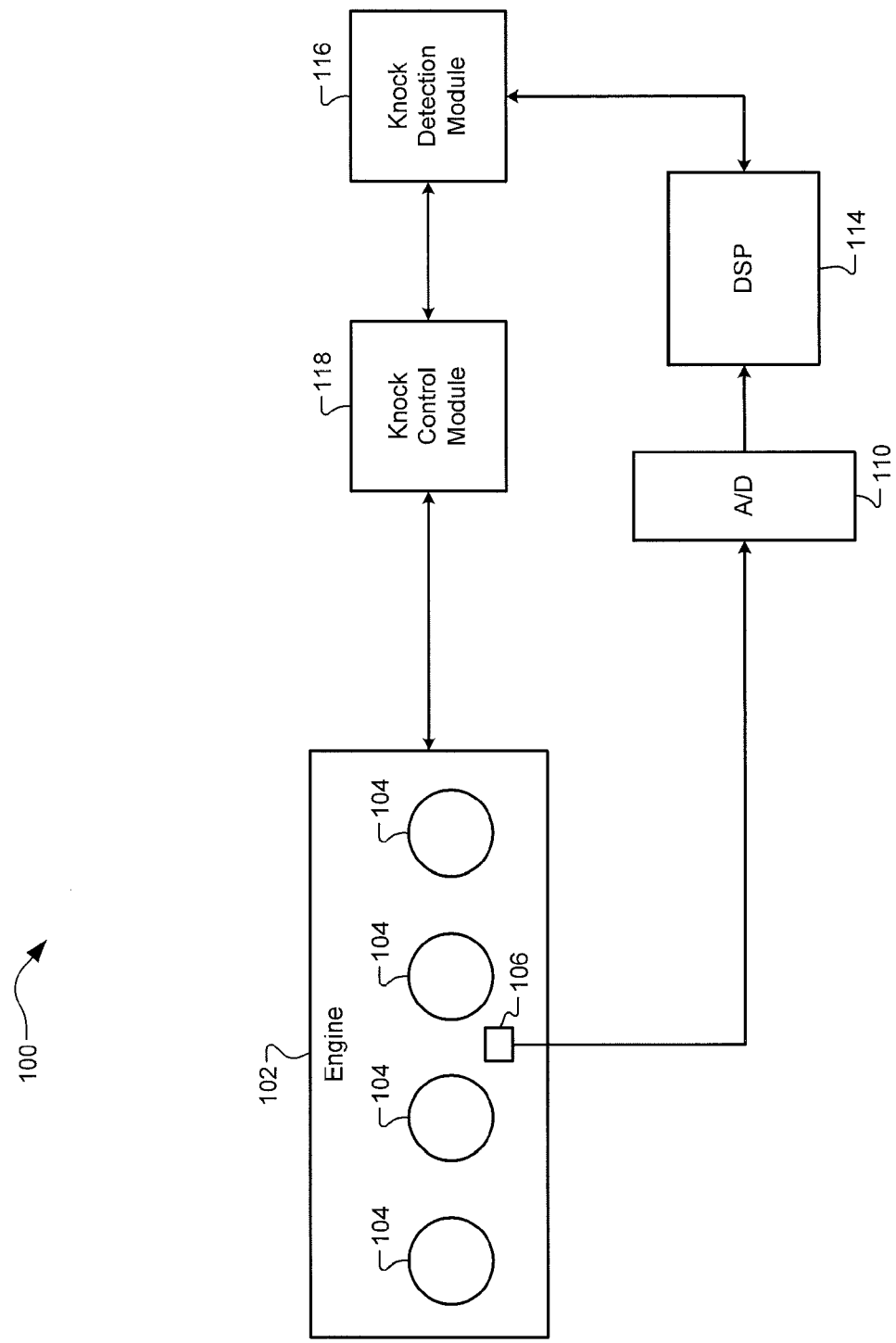
FIG. 1 is a functional block diagram of a knock control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In contrast to the prior art, background engine vibration can be more accurately characterized to increase the accuracy of knock detection in an engine. For example, instead of determining a single background vibration profile for the engine, background vibration profiles may be determined individually for each cylinder. In addition, multiple background vibration characteristics may be determined for each cylinder for various engine operating conditions.

For example, a background vibration profile can be determined for each cylinder at a given engine speed and load. This can prevent false knock detection during engine transients, such as when the engine's speed rapidly increases. According to the present disclosure, a different background vibration profile may take into account the greater speed. In this way, greater vibration due to changing engine conditions is not falsely detected as knock.

Figure 2:
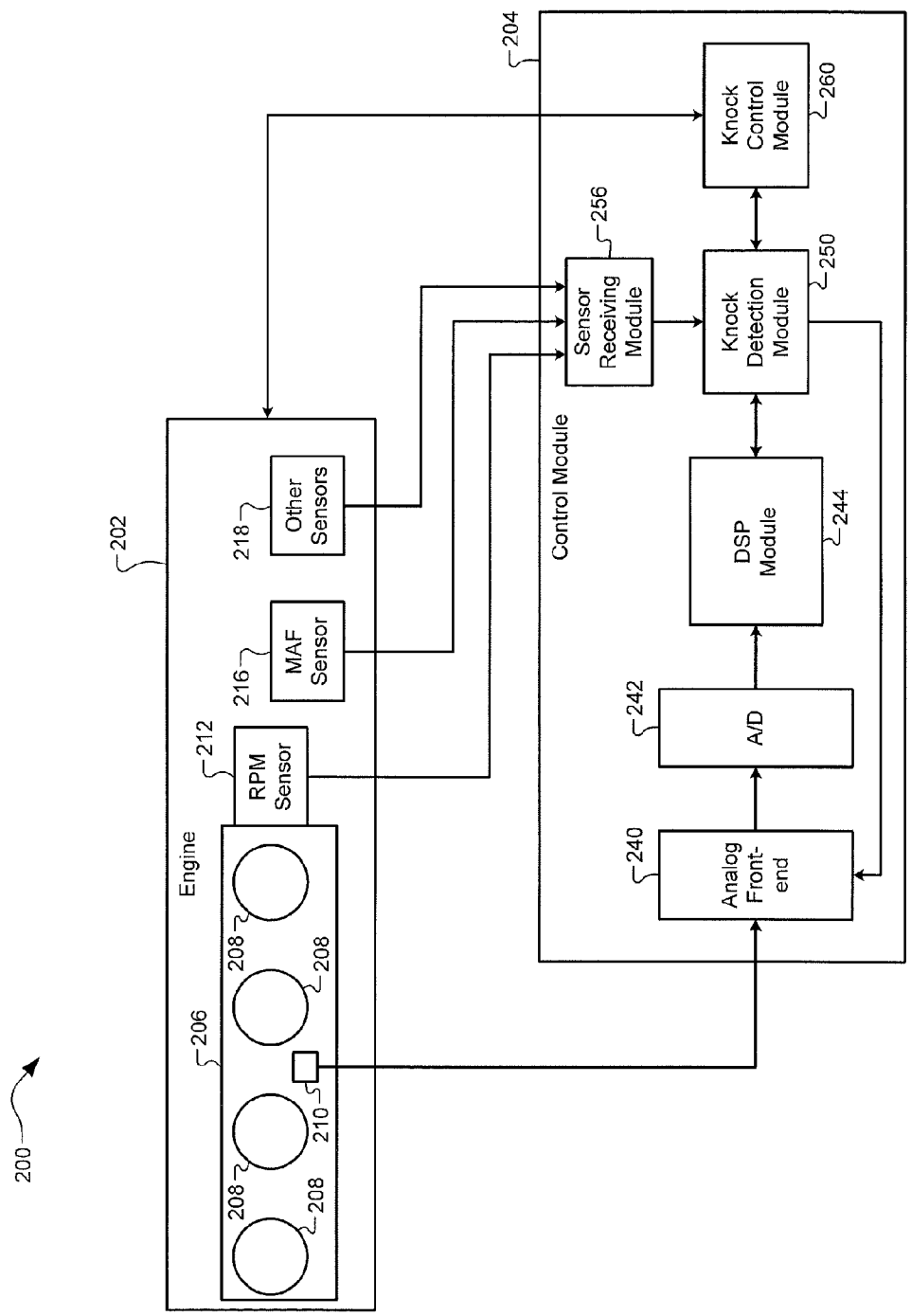
FIG. 2 is a functional block diagram of an exemplary knock control system according to the principles of the present disclosure.

Referring now to FIG. 2, a functional block diagram of an exemplary knock control system 200 according to the principles of the present disclosure is presented. The system 200 includes an engine 202 and a control module 204. The engine 202 includes at least one cylinder bank 206. Each cylinder bank 206 includes one or more cylinders 208. Each cylinder bank 206 includes at least one vibration sensor 210.

The engine 202 includes an engine revolutions per minute (RPM) sensor 212. The RPM sensor 212 may be connected to a crankshaft (not shown) of the engine 202. The engine 202 may also include a Mass Air Flow (MAF) sensor 216 and other sensors 218. The control module 204 includes an analog front-end 240, which receives signals from the vibration sensor 210. The analog front-end 230 may also receive signals from other vibration sensors, if present, and may select between the signals from the vibration sensors.

For example, the engine 202 may contain multiple banks of cylinders, each with a respective vibration sensor. The analog front-end 240 may select the vibration sensor 210 if one of the cylinders 208 of the first bank 206 is being measured. The analog front-end 240 may select a second vibration sensor if a cylinder of a second bank is being measured.

If multiple vibration sensors are present in the cylinder bank 206, the analog front-end 240 may select one or more of the vibration sensors based upon which one of the cylinders 208 is being measured. The selected vibration sensor may be the one closest to the cylinder being measured. The analog front-end 240 may include a differential input circuit. The differential input circuit may convert a differential input from the vibration sensor 210 into a single-ended output.

The analog front-end 240 may include an analog filter that filters the output of the vibration sensor 210. For example, the analog filter may be a first-order filter with a low-pass cutoff frequency of 25 kHz. The analog front-end 240 may include a gain/attenuation module, such as an automatic gain control module. Alternatively, the gain/attenuation module may amplify or attenuate by a predetermined amount.

An output of the analog front-end 240 is transmitted to an analog-to-digital (A/D) converter 242. The A/D converter 242 outputs a digitized version of its input to a digital signal processing (DSP) module 244. The A/D converter 242 may have, for example, 10 bit or greater resolution. The DSP module 244 may apply a digital filter to the received signal. For example, the DSP module 244 may implement a fourth-order elliptic Infinite Impulse Response (IIR) digital filter with a cutoff frequency of 20 kHz.

Alternately, the DSP module 244 may implement two second-order IIR filters in series to improve stability. The DSP module 244 may perform digital decimation and may remove DC bias. For each of the cylinders 208, the DSP module 244 performs at least one FFT during a knock window. The knock window may be defined in crankshaft rotational degrees.

The knock window may correspond to piston top dead center (TDC) for the cylinder. For example, if the engine 202 includes four cylinders 208, TDC for the four cylinders 208 may occur at 0°, 90°, 180°, and 270° of crankshaft rotation, respectively. An FFT is calculated for each cylinder 208 within a knock window defined relative to the TDC of that cylinder. The knock window may be fixed relative to TDC.

For example, the knock window for each cylinder may span from two crankshaft rotational degrees prior to TDC until one crankshaft rotational degree after TDC. A knock detection module 250 may specify the knock window to the DSP module 244. The knock window may be varied based upon engine RPM or other engine operating parameters.

The knock window may be specified separately for each cylinder. If a knock window is long enough, the DSP module 244 may compute multiple FFTs during the knock window. If the last FFT is only partially completed when the knock window ends, the last FFT may be zero-padded. The control module 204 may include a second A/D converter and a second DSP module to allow for the knock window of one cylinder to overlap with the knock window of another cylinder.

In various implementations, the DSP module 244 performs 128-point FFTs. If multiple FFTs are performed for a cylinder's knock window, the DSP module 244 may combine the FFTs into an aggregate FFT and pass the aggregate FFT to the knock detection module 250. Alternatively, the DSP module 244 may pass all calculated FFTs to the knock detection module 250.

The knock detection module 250 or the DSP module 244 may aggregate multiple FFTs point by point (or, frequency bin by frequency bin). For each bin, the maximum value or an average value across the FFTs may be selected. In various implementations, half of the FFT bins are ignored because of aliasing.

The knock detection module 250 may instruct the analog front-end 240 on which vibration sensor to select for the currently desired measurement. The knock detection module 250 may also signal to the DSP module 244 when a knock detection window begins and/or ends. The knock detection module 250 receives sensor values from a sensor receiving module 256.

The sensor receiving module 256 may receive sensor signals from the RPM sensor 212, the MAF sensor 216, and the other sensors 218. The sensor receiving module 256 may condition incoming signals, including functions similar to those performed by the analog front-end 240, and/or may convert incoming signals to digital. In various implementations, the knock detection module 250 may be implemented as part of an engine control module.

The RPM sensor 212 may transmit signals based upon crankshaft angle so that the knock detection module 250 can determine when knock windows occur. Based upon signals from the sensor receiving module 256, the knock detection module 250 can determine in which zone the engine 202 is currently operating. The zone may be determined based upon engine speed, which may be indicated by the RPM sensor 212, and by engine load, which may be indicated by the MAF sensor 216. In various implementations, 68 zones correspond to 17 engine speeds and 4 engine loads.

For each cylinder knock window, the knock detection module 250 may receive an aggregate FFT from the DSP module 244. The knock detection module 250 compares the received aggregate FFT to a stored background vibration profile for the current cylinder and zone. The knock detection module 250 may inform the knock control module 260 when knock has occurred and may specify the intensity of the knock.

If knock is not detected, the knock detection module 250 may use the received aggregate FFT to update the background vibration profile for the current cylinder and zone. The knock detection module 250 may calculate a single intensity value based from various frequency bins of the aggregate FFT. This single intensity value can then be compared to the background vibration profile and may be used to update the background vibration profile.

In various implementations, the background vibration profile for a certain cylinder in a certain zone may include an average intensity and a standard deviation. The knock detection module 250 may determine that knock is occurring if the current intensity value is greater than the background average intensity plus a predetermined number of standard deviations. The predetermined number of standard deviations may be determined by a calibrator.

The knock detection module 250 may determine knock in any other suitable fashion, such as by determining whether the current intensity value is greater than an average background value by a predetermined amount. The knock control module 260 coordinates with the engine 202 to decrease knock. For example, the knock control module 260 may instruct the engine 202 to retard spark. The knock control module 260 may be implemented in the engine control module.

Figure 3:
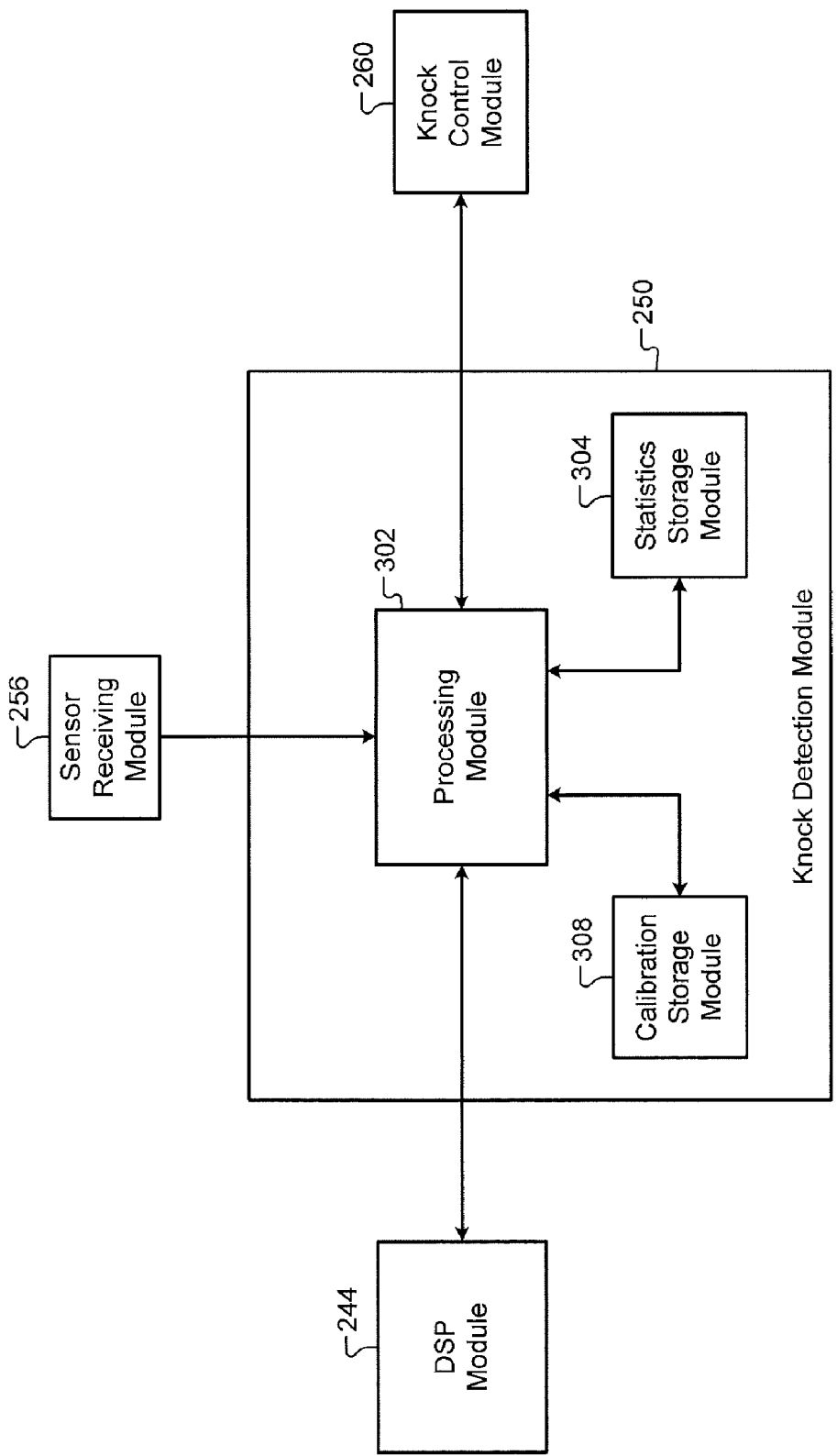
FIG. 3 is an exemplary functional block diagram of a knock detection module according to the principles of the present disclosure.

Referring now to FIG. 3, an exemplary functional block diagram of the knock detection module 250 according to the principles of the present disclosure is presented. The knock detection module 250 includes a processing module 302 and a statistics storage module 304. The knock detection module 250 may also include a calibration storage module 308.

The processing module 302 communicates with the DSP module 244, the sensor receiving module 256, and the knock control module 260. The processing module 302 receives an aggregate FFT from the DSP module 244. The processing module 302 may calculate a single intensity value from the aggregate FFT. This calculation may be performed based upon the current zone and/or the current cylinder being measured.

The processing module 302 may analyze only a subset of the bins of the FFT that correspond to frequencies most likely indicative of knock events. Frequency bin selection information may be stored in the calibration storage module 308. The calibration storage module 308 includes nonvolatile memory and may be programmed by the calibrator.

In various implementations, the frequency bin selection information indicates up to three bin ranges of interest. The processing module 302 may then average or find the peak value of intensities to create a single range value for each bin range. The processing module 302 may then average or take the peak value of the single range values to create an overall intensity value.

Computation choices, such as whether to average or take the peak value when calculating each single range value and when calculating the overall value, may be stored in the calibration storage module 308. The processing module 302 compares the current overall intensity value to an intensity value from the statistics storage module 304 corresponding to the current cylinder and zone.

The statistics storage module 304 may include nonvolatile memory to preserve background vibration profiles through engine restart events. Nonvolatile memory may include, for example, flash memory (including NAND and NOR flash memory), phase change memory, magnetic RAM, and/or multi-state memory. The statistics storage module 304 and the calibration storage module 308 may be implemented within a single memory. The statistics storage module 304 may receive initial values from the calibration storage module 308.

Initial values allow the statistics storage module 304 to begin with approximate background vibration intensities and standard deviations. In this way, early readings where knock has occurred are not erroneously included in the background vibration profile. Initial values from the calibration storage module 308 may be used when the vehicle is started for the first time or upon a manual reset of the statistics storage module 304. A manual reset may be initiated by a service technician or by an internal diagnostic routine when it determines that values in the statistics storage module 304 are invalid.

The processing module 302 may determine that knock has occurred if the overall intensity value is greater than the average intensity for this cylinder and load plus a predetermined number of standard deviations. The predetermined number of standard deviations may be programmed in the calibration storage module 308.

If the overall intensity value is not indicative of knock, the overall intensity value may be incorporated into the vibration profile for the current cylinder and zone. In various implementations, the processing module 302 may keep a running average and a running standard deviation for each cylinder and zone.

Alternatively, the processing module 302 may calculate a new average and standard deviation after measuring P points for a given cylinder in a given zone. The number P may be determined by the calibrator and stored in the calibration storage module 308. In various implementations, P is 1000. In various implementations, the standard deviation calculated is a true standard deviation, and not an approximation.

Figure 4:
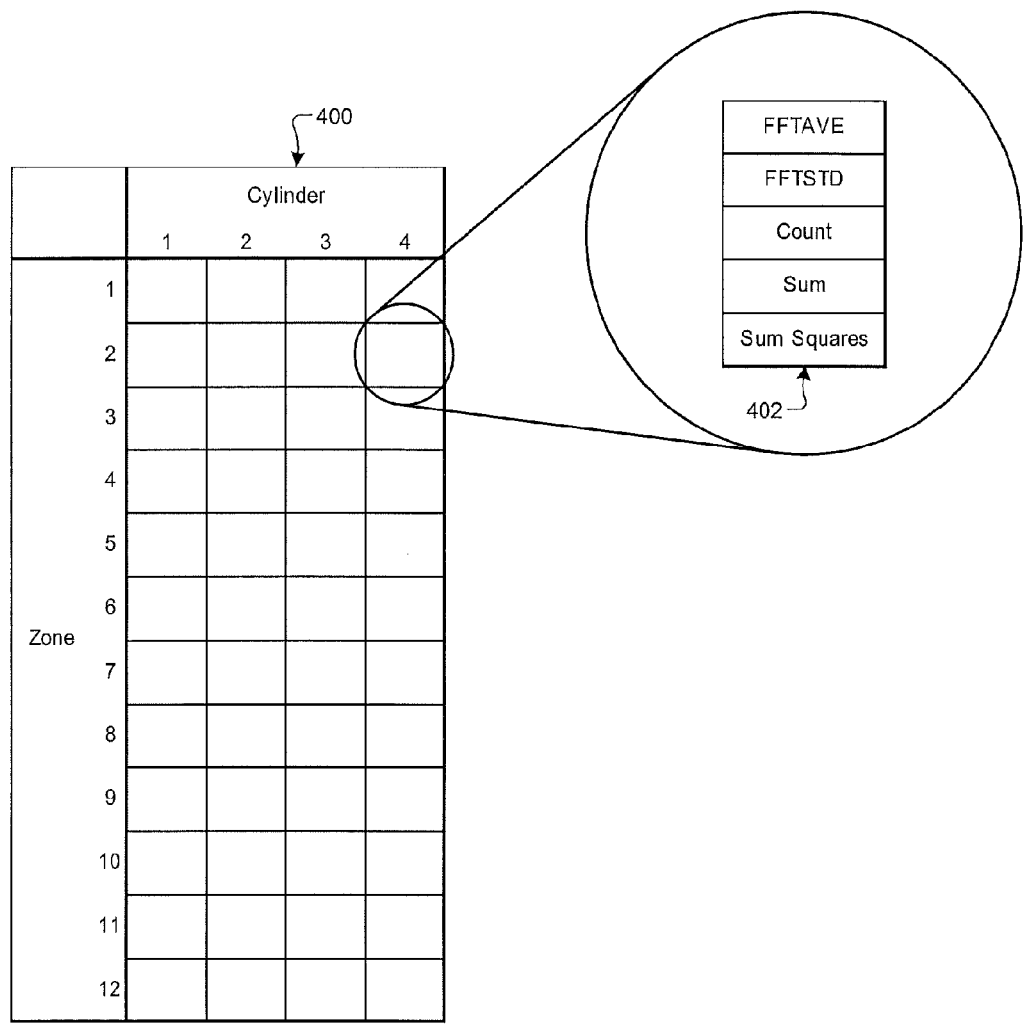
FIG. 4 is a graphical representation of exemplary statistics storage module contents according to the principles of the present disclosure.

Referring now to FIG. 4, a graphical representation of exemplary contents of the statistics storage module 304 according to the principles of the present disclosure is presented. The statistics storage module 304 may include a two-dimensional table 400 that includes a grid of cells specified by cylinder and zone. For example only, the table 400 may include cells for 4 cylinders and 12 zones. For example only, the 12 zones may encompass four RPM ranges and three load ranges.

If the zone is determined based upon engine speed and engine load, the table 400 may alternatively be represented as a three dimensional table indexed by cylinder, RPM, and load. A representative cell of the table 400 is shown at 402. The cell 402 includes average and standard deviation values to which new overall intensity values are compared.

The cell 402 may also include statistical information used to calculate future average and standard deviation values. For example, the cell 402 may include a count, a running sum, and a running sum of squares. When a new intensity value is measured for a given cylinder operating in a given zone, the count element is incremented for the corresponding cell. The sum element may also be increased by the overall intensity value, while the sum of squares element is increased by the square of the intensity.

Once the count element reaches a predetermined value, a new average and standard deviation can be calculated and stored into the cell 402. By storing the sum and the sum of squares, a true standard deviation can be calculated, as contrasted with an approximation of standard deviation. After calculation, the count element, the sum element, and the sum of squares element can then be reset to predetermined values, such as zero.

Storing the sum and the sum of squares minimizes the amount of storage required for calculating average and standard deviation. This is more efficient than storing all of the intensity values until the time when the average and standard deviation are calculated. For example, if the average and standard deviation is calculated every 1000 readings, the cell 402 would need to store 1000 values. According to the present disclosure, the cell 402 needs to store only 3 values.

Figure 5:
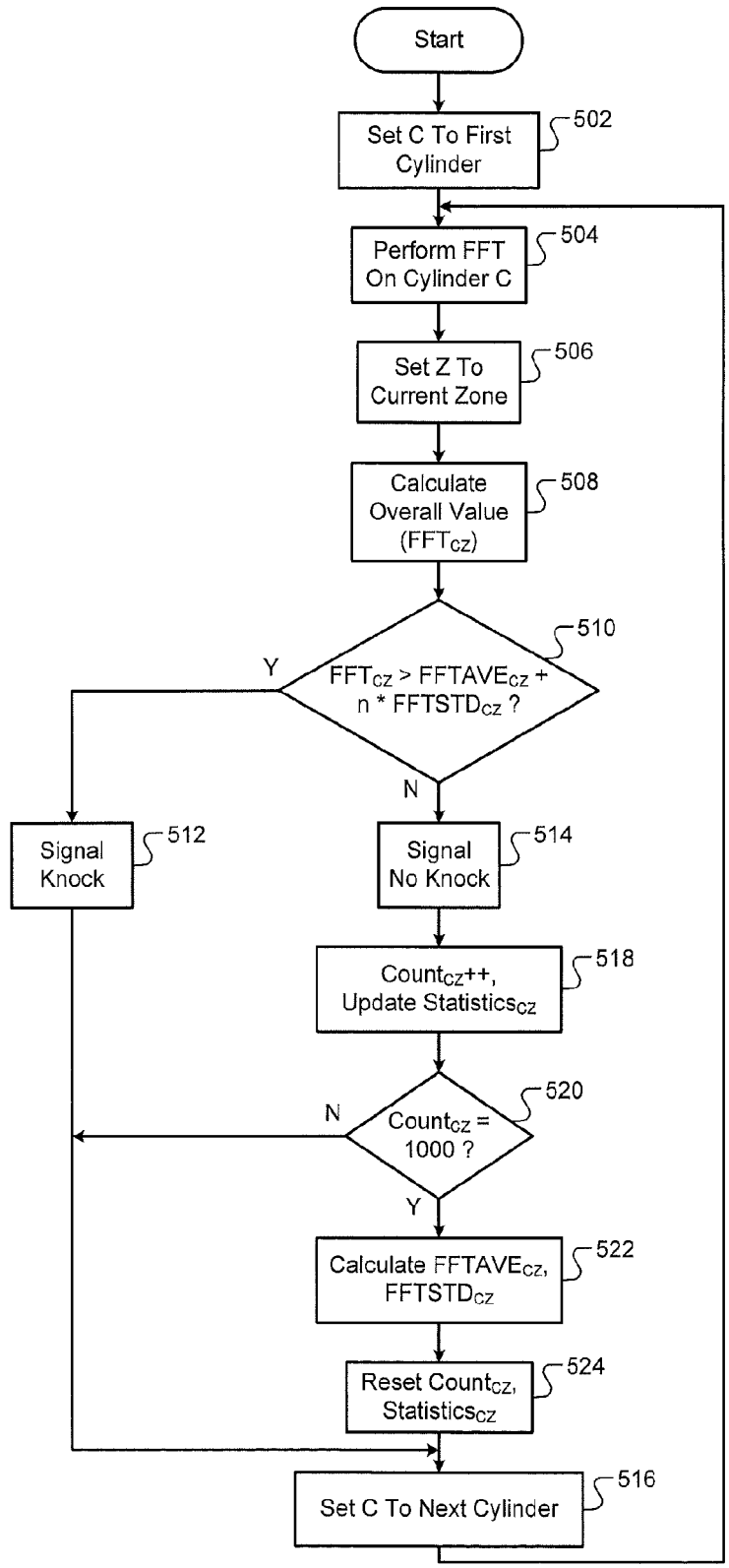
FIG. 5 is a flowchart depicting exemplary steps performed by the processing module of FIG. 3 according to the principles of the present disclosure.

Referring now to FIG. 5, a flowchart depicts exemplary steps performed by the processing module 302 of FIG. 3 according to the principles of the present disclosure. Control begins in step 502, where a variable C is set to the cylinder number of the cylinder that will first experience a piston top dead center (TDC) event. Control continues in step 504, where one or more FFTs is performed on the cylinder specified by the variable C. The FFTs may be performed during a knock window corresponding to cylinder C.

Control continues in step 506, where control sets a variable Z to a number representing the current engine operating zone. For example, there may be M times N zones, where M represents the number of RPM ranges and N represents the number of engine load ranges. In various implementations, M is equal to 17 and N is equal to 4.

In various implementations, the engine RPM range of the vehicle may be segmented into M mutually exclusive regions, with each region being numbered from 0 to M−1. The engine load range of the vehicle may be segmented into N regions numbered from 0 to N−1. The variable Z may be determined by multiplying the current RPM range number by N and adding it to the current load range number. Any other suitable mapping may be used to determine zone number.

Control continues in step 508, where an overall intensity value is calculated. As discussed above, this value may be calculated by averaging or selecting peak values within frequency ranges of interest, across multiple FFTs, and across frequency ranges of interest. The overall intensity value is labeled $FFT_{cz}$ to indicate that the value corresponds to cylinder C with the engine operating in zone Z.

Control continues in step 510, where $FFT_{cz}$ is compared with stored statistical values. For example, if $FFT_{cz}$ is greater than the average intensity for the current cylinder and zone ($FFTAVE_{cz}$) plus a predetermined number of corresponding standard deviations ($FFTSTD_{cz}$), control determines that knock has occurred. If knock has been detected, control transfers to step 512; otherwise, control transfers to step 514.

In step 512, the occurrence of knock is signaled and control continues in step 516. The intensity of the knock may be signaled in addition to the presence or absence of knock. In step 514, control signals that no knock was detected. Control continues in step 518, where the background vibration profile for the current cylinder and zone is updated.

For example, the count element is incremented, the sum element is increased by $FFT_{cz}$, and the sum of squares element is increased by the square of $FFT_{cz}$. Control continues in step 520. If the count element for the current cylinder and zone ($Count_{cz}$) has reached a predetermined number, such as 1000, control transfers to step 522; otherwise, control transfers to step 516.

In step 522, new values for average intensity and standard deviation are calculated. Control continues in step 524, where the corresponding count and statistics values are reset. Control then continues in step 516. In step 516, the variable C is set to the next cylinder that will experience a TDC event, and control returns to step 504.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A knock detection module for an engine, comprising:
   a statistics storage module that stores M times N vibration profiles corresponding to M zones of operation of said engine and N cylinders of said engine, wherein M and N are integers greater than one; and
   a processing module that determines in which one of said M zones said engine is operating and that determines whether knock has occurred for one of said N cylinders by comparing measured vibration data with a selected one of said vibration profiles corresponding to said one of said M zones and said one of said N cylinders.

2. The knock detection module of claim 1 wherein each of said vibration profiles includes an average value and a standard deviation value.

3. The knock detection module of claim 2 wherein said processing module determines that knock has occurred if said measured vibration data is greater than said average value of said selected one of said vibration profiles plus a predetermined number times said standard deviation value of said selected one of said vibration profiles.

4. The knock detection module of claim 1 wherein said processing module updates said selected one of said vibration profiles with said measured vibration data after said processing module has determined that knock has not occurred.

5. The knock detection module of claim 4 wherein each of said vibration profiles includes a count value, and said processing module updates said count value of said selected one of said vibration profiles when said selected one of said vibration profiles is updated.

6. The knock detection module of claim 5 wherein each of said vibration profiles includes a sum of squares and a sum, and said processing module updates said sum of squares and said sum of said selected one of said vibration profiles when said selected one of said vibration profiles is updated.

7. The knock detection module of claim 5 wherein said processing module recalculates said average value and said standard deviation value of said selected one of said vibration profiles when said count value of said selected one of said vibration profiles reaches a predetermined number.

8. The knock detection module of claim 1 wherein said processing module calculates a true standard deviation for said vibration profiles.

9. The knock detection module of claim 1 wherein said statistics storage module comprises nonvolatile memory.

10. The knock detection module of claim 1 wherein said measured vibration data is based upon measurements made during a specified time window corresponding to said one of said N cylinders.

11. The knock detection module of claim 10 further comprising a digital signal processor (DSP) that performs a Fast Fourier Transform (FFT) including F points during said specified time window.

12. The knock detection module of claim 11 wherein said DSP performs a plurality of FFTs during said specified time window, and said processing module combines said plurality of FFTs into an aggregate FFT.

13. The knock detection module of claim 11 wherein said measured vibration data comprises an intensity value and said processing module reduces said F points to said intensity value.

14. A method for detecting knock in an engine, comprising:
storing M times N vibration profiles corresponding to M zones of operation of said engine and N cylinders of said engine, wherein M and N are integers greater than one;
determining in which one of said M zones said engine is operating;
measuring vibration data for one of said N cylinders; and
determining whether knock has occurred for said one of said N cylinders by comparing measured vibration data with a selected one of said vibration profiles corresponding to said one of said M zones and said one of said N cylinders.

15. The method of claim 14 wherein each of said vibration profiles includes an average value and a standard deviation value.

16. The method of claim 15 further comprising determining that knock has occurred if said measured vibration data is greater than said average value of said selected one of said vibration profiles plus a predetermined number times said standard deviation value of said selected one of said vibration profiles.

17. The method of claim 14 further comprising updating said selected one of said vibration profiles with said measured vibration data after determining that knock has not occurred.

18. The method of claim 17 wherein each of said vibration profiles includes a count value, and wherein said updating further comprising updating said count value of said selected one of said vibration profiles.

19. The method of claim 18 wherein each of said vibration profiles includes a sum of squares and a sum, and wherein said updating further comprises updating said sum of squares and said sum of said selected one of said vibration profiles.

20. The method of claim 18 further comprising recalculating said average value and said standard deviation value of said selected one of said vibration profiles when said count value of said selected one of said vibration profiles reaches a predetermined number.

21. The method of claim 14 further comprising calculating a true standard deviation for said vibration profiles.

22. The method of claim 14 further comprising storing said vibration profiles in nonvolatile memory.

23. The method of claim 14 wherein said measured vibration data is based upon measurements made during a specified time window corresponding to said one of said N cylinders.

24. The method of claim 23 further comprising performing a Fast Fourier Transform (FFT) including F points during said specified time window.

25. The method of claim 24 further comprising:
performing a plurality of FFTs during said specified time window; and
combining said plurality of FFTs into an aggregate FFT.

26. The method of claim 24 wherein said measured vibration data comprises an intensity value, and further comprising reducing said F points to said intensity value.

* * * * *